Figure 1:
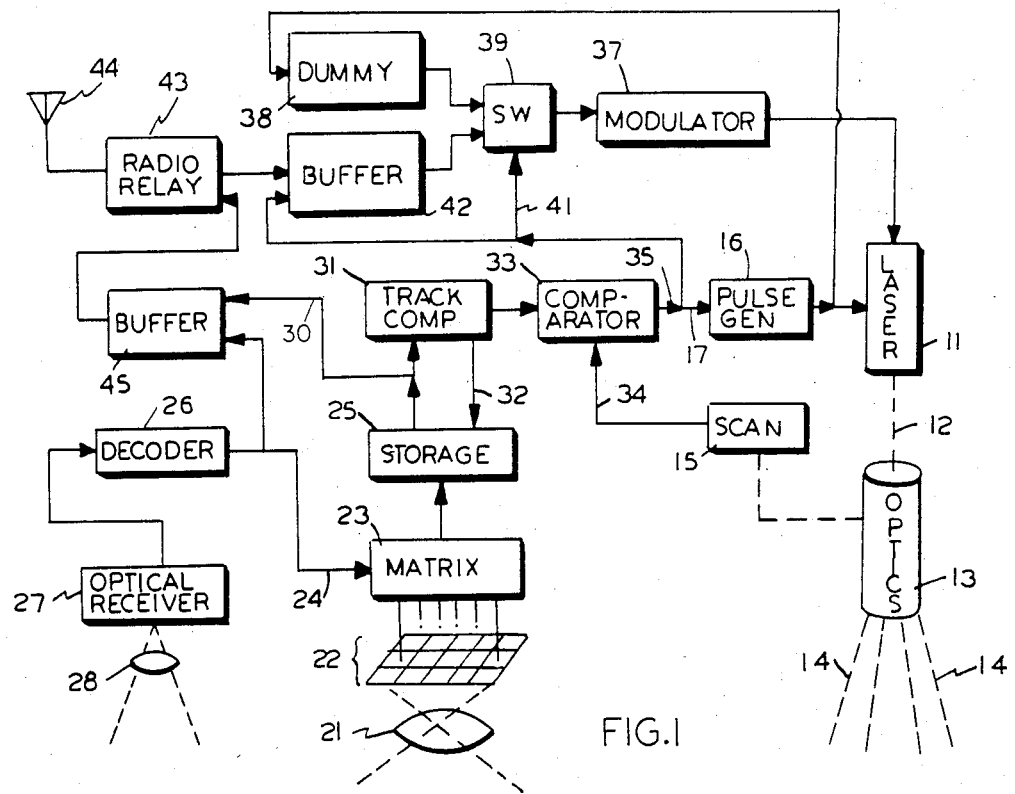

United States Patent [19]

Pfund

[11] Patent Number: 4,664,518
[45] Date of Patent: * May 12, 1987

[54] SECURE COMMUNICATION SYSTEM

[76] Inventor: Charles E. Pfund, 16 Balcarres Rd., West Newton, Mass. 02165

[*] Notice: The portion of the term of this patent subsequent to Jul. 14, 1998 has been disclaimed.

[21] Appl. No.: 248,518

[22] Filed: Mar. 27, 1981

Related U.S. Application Data

[62] Division of Ser. No. 206,766, Jul. 2, 1962, Pat. No. 4,279,036.

[51] Int. Cl.[4] .................. G02F 1/00; G01B 11/26; G01J 1/20
[52] U.S. Cl. ................ 455/606; 250/203 R; 356/152; 455/601; 455/609
[58] Field of Search .............. 356/152; 250/203 R; 455/601, 606, 609

[56] References Cited

U.S. PATENT DOCUMENTS

| | | | |
|---|---|---|---|
| 2,494,645 | 1/1950 | Collins | 455/606 |
| 2,982,859 | 5/1961 | Steinbrecher | 250/205 |
| 3,060,425 | 10/1962 | Cutler | 343/112 R |
| 3,095,538 | 6/1963 | Silberstein | 343/5 W |

Primary Examiner—Stephen C. Buczinski
Attorney, Agent, or Firm—Charles E. Pfund

[57] ABSTRACT

A secure communication system uses narrow beam laser transmissions between an orbiting satellite and another station which may be a submerged submarine. Position reporting by a laser transmission from the submarine to the satellite provides for tracking and data transmission between the stations. For strategic use tracking of the submarine for one way data transmission is achieved from a single laser transmission from the submarine while transporting mode operation is provided for a two-way transmission data link.

15 Claims, 2 Drawing Figures

SECURE COMMUNICATION SYSTEM

This is a division of application Ser. No. 206,766, filed July 2, 1962, now U.S. Pat. No. 4,279,036.

This invention relates generally to communication systems and more particularly to a secure communication system capable of world-wide two way communication with mobile vehicles.

The maintenance of an adequate secure communication link with nuclear powered submarines as they range throughout the oceans of the world is a problem of prime importance to present day military operations. Several severe requirements for such a communications link must be met. In addition to maintaining contact with the vehicle for command information, it is of paramount importance that the present position of the vehicle not be disclosed to the enemy. Since the location and destruction of a country's nuclear powered submarine forces will be a primary objective in the event of actual armed conflict, ordinary communication systems cannot be employed.

Ordinary radio communications and underwater sound communication systems are readily detectable and capable of being monitored with instruments which will indicate the location of the source of the transmitted energy, and hence are not considered secure for a submarine operating in enemy waters. Even the erection of a radio receiving antenna is fraught with a certain amount of danger since the waters in which a submarine may be operating will likely be kept under radar surveillance and the presence of an efficient radio receiving antenna above the surface of the water will be readily detectable.

The use of extremely low frequency radio waves has been resorted to as one solution for contacting submarines on a world-wide basis and these systems have the capability of contacting submarines submerged beneath the surface of the sea. These low frequency systems are extremely limited in bandwidth and hence information content that can be transmitted in a given interval of time. Due to these limitations, cryptographic code transmissions are hampered and the possibility of selective calling is limited. Furthermore, the return message from a submarine requires the erection of a surface antenna with the consequent possibility of detection.

The present invention provides a system which maintains a substantially continuous wide band communication link with any suitably equipped mobile station anywhere in the world and does so in such a way that the probability of detection of the location of the mobile station is extremely remote. This system has the capability of communicating with submarines submerged under some favorable conditions and in any event provides for communication with submarines with nothing more than an undetectable surface unit required under the worst conditions. The communication link is maintained without any continuous radiation emanating from the submarine and is established by a single instantaneous burst type transmission from the submarine which is confined to such a narrow beam that its detection and short duration make the probability of loss of security almost negligible.

The present invention provides a communication system which uses an established set of relay stations which preferably will be orbiting earth satellites of either stationary orbit or in a polar orbit with known paths so that present position is always predictable to both the shore base or command station and the mobile vehicle with which it is required to communicate. Preferably the system of relays is provided by a suitable system of orbiting earth satellites, but in a given tactical situation a relay station of a temporary nature may be launched for relaying messages during a limited interval of time while the tactical situation is in existance. The description of the present invention will proceed, however, with reference to a system of earth satellites carrying equipment to be herein described. The number of satellites required and their relative positions will be determined by the range of the equipment employed and the periodicity with which contact is required to be made. For example, if only periodic contact is required, a single orbiting satellite in polar orbit would be sufficient to make contact between the mobile vehicle and fixed station several times each day. On the other hand, if continuous contact is required as may be necessary for the split second decisions and communications required in the event of nuclear war, a system of satellites may be employed such that a given mobile vehicle will always have at least one satellite visible from its location anywhere on earth.

In accordance with the present invention, the satellite or other relay station is employed to contact a submarine or other vehicle on the earth's surface or beneath the sea and relay messages to and from the submarine or other mobile vehicle from a fixed command station. For this purpose the relay may employ any form of communication link, including conventional radio communications, between the fixed station and the satellite with the communication being made preferably in code and suitable cryptographic techniques employed to maintain the message secure even though it is broadcast by radio transmission. Since the advent of phased array radar systems, it will be within the capability of any enemy to locate the position of all satellites orbiting the earth and hence, the presence of such a communications relay satellite must be assumed to be disclosed to the enemy and not relied upon for security in maintaining communications. In order to employ such a known satellite for secure communications with the submarine, therefore, it will be necessary to conduct the communication with the submarine without disclosing the submarine's position. For this purpose the present invention employs a laser to communicate over an optical beam of narrow beam width which transmits coherent light and employs broad-band modulation so that pulse transmissions of brief duration can transmit messages of high information content.

To communicate with an optical beam, such as produced by a laser and suitable optics, it is necessary to orient the beam in the direction of the intended receiver in order that the beam can be received at the receiver. Under these conditions the perception of a beam which is directed to the submarine with which it is desired to communicate presents the possibility of detecting the submarine's position. In order to avoid the correlation of beam position with submarine position, should the beams from the satellite laser be detected, the present invention provides for a plurality of transmissions over a volume scan with false messages modulated on each periodic transmission to random points in the volume scan so that the enemy is confronted with a large number of transmissions having no identifiable characteristic to distinguish those which are false from the beam actually pointing at a submarine. The false beams are used only for the purpose of camouflaging the one or more true angular directed beams which actually are pointed to one or more submarines. Since the periodicity of these decoy transmissions throughout the volume scanned can be made large, the feasibility of an enemy checking out all of the beam transmissions to determine if a projected line along the beam would actually lead to a submarine receiver would be completely impracticable.

In order to communicate by means of laser beams, it is necessary that the beam be directed at the receiver, as previously stated. The principal problem in communication between a satellite and a submarine therefore is to supply the satellite with information which would permit the laser beam from the satellite to be directed toward the submarine. For this purpose the present invention employs a transmission from the submarine in the form of a single narrow beam burst from a laser source which is of such short duration and narrow beam width and so sporadic in repetition that the risk that the submarine will be detected by the interception by an enemy of this transmission is all but negligible. The purpose of the laser beam transmission from the submarine to the satellite is to provide in the satellite in a single instant the information of the submarine's location for use in orienting the laser beam from the satellite to point toward the submarine. Once the submarine has supplied this information by a single optical burst of transmission received at the satellite, no further transmission from the submarine is required since this information is utilized in the satellite to orient the laser beam from the satellite to illuminate the submarine optical receiver and to track the submarine as the satellite continues in orbit. Thus no further transmission from the submarine is required until either the submarine itself changes position on the surface or beneath the sea or in the event that the submarine desires to transmit a message for relay by the satellite. Such transmissions may be made in a short time interval due to the wide bandwidth the optical laser provides thus permitting large information content in short transmission times.

In employing the system of the present invention, various wellknown techniques can be employed to enhance the security of the system. For example, the various transmissions and the coding employed to prevent unauthorized access to the system can be programed on a suitable cryptographic basis which is known to a friendly submarine and a friendly shore station and programed into the satellite so that the benefit of a definitely programed cryptographic sequence can be utilized to avoid compromising the system. It will further be possible for the submarine to have precise information about the orbit of the relay satellites employed and therefore it will be possible, since the submarine in general knows its own position quite accurately, for the laser transmission from the submarine to the satellite to be accomplished with a single transmission. The information about the orbit of the satellite and the submarine's own accurately known position should be known with sufficient accuracy to aim the submarine's laser beam to intercept the satellite.

The transmissions from the satellite over the volume scanned are modulated by dummy messages in all instances except those in which the beam is directed to a submarine receiver to which an actual message is to be sent. Hence to an unauthorized receptor of such messages, no characteristic can be detected which will distinguish a true message beam from a false one. This may be accomplished by suitably encoding both the dummy and real messages in a coded transmission which makes the false message appear to be as plausible a transmission as the true transmission code sequence.

In order to maintain a communication link once the submarine has emitted the tracking laser and the satellite laser has found the location of the submarine with the aid of this single transmission therefrom, a track computer is employed in the satellite which utilizes inertial data or data relating to its own orbit introduced from the ground station which permits the laser beam transmitting the true message to track the submarine in angular orientation as the satellite proceeds on its orbit. This tracking of the submarine's position from the satellite can obviously be scheduled to be maintained for a period corresponding to the accuracy of the tracking system or can be automatically terminated by the time the satellite has moved to a position from which laser beam transmission to the submarine is unfavorable, such as the position at which the satellite would be low on the horizon from the submarine's position.

The operational techniques for the submarine using the present invention require that the submarine periodically contact one of the satellite relays with its laser beam, which contact would complete the communication link with the shore station by transmitting to the shore station the information that the link had been completed and give the shore station the location of the submarine. This position information is read out of a storage device on the satellite which stores the angular position of the submarine for contacting the submarine by orienting the satellite laser beam and maintaining tracking of the angular position of the submarine as previously described. Once the communication link has been completed, the silence on the part of the submarine insures the security of the system and only when the submarine itself moves to a new location or when the satelite has moved in orbit to a position from which communication with the submarine is no longer possible need the submarine transmit any further energy. The requirement for the submarine to repeat its transmission to maintain contact with a satellite relay on either a periodic basis or on a continuous basis will be determined by operational considerations.

The extremely narrow beams transmitted by lasers constitute a feature contributing to the security of the system of the present invention. As a practical matter, however, in view of the equipment required for initial orientation of these beams and the tracking of the beams as relative motion occurs when the satellite moves in orbit, it in all probability will be necessary to use somewhat divergent laser beams obtained through the use of suitable optics rather than the extremely parallel beams of which the laser is capable. To the extent that divergent beams are required by the angular accuracy with which the orientation systems are able to operate, the detectability of the beams will be increased with respect to unauthorized interception of the beam by enemy observers. The angular accuracy capable of being built into the system, however, should be such that the beams can be oriented in the proper position for making the system operative with the employment of beams which are considerably less divergent than the narrowest radar beams, and hence the detectability of the beams to anyone who is slightly off axis should still present considerable difficulty and thus enhance security in the system.

Figure 2:
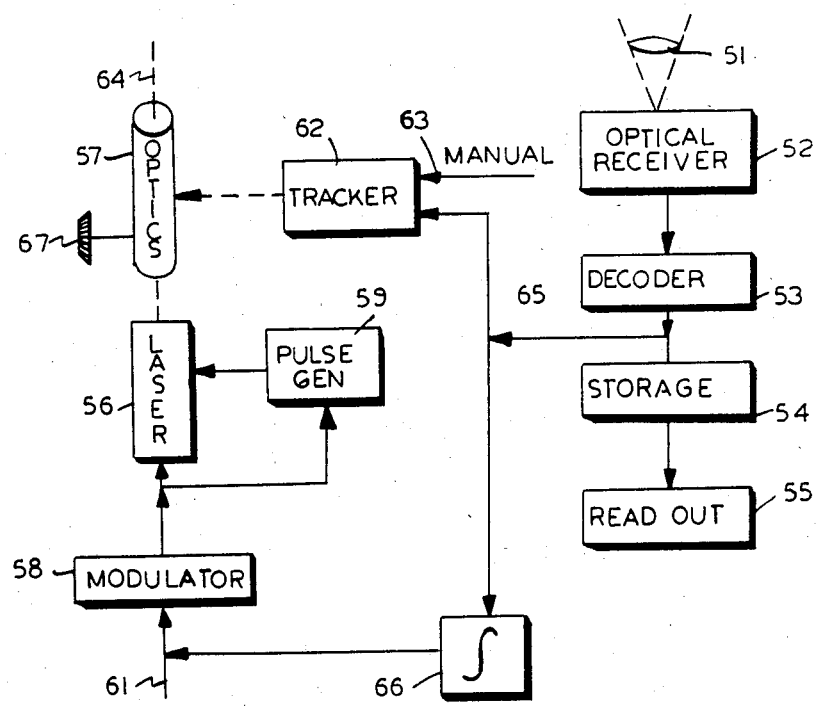

It is the object of the present invention to provide a communication system embodying the foregoing features for the purpose of providing secure communications with a submarine or other mobile vehicles. These and other objects and features of the invention will be understood from the following detailed description taken in conjunction with the accompanying drawings wherein:

FIG. 1 is a block diagram of the equipment present in a satellite as employed in the invention; and FIG. 2 is a block diagram of the equipment aboard the submarine in accordance with the invention.

Referring now to FIG. 1, the equipment contained in the orbiting satellite in accordance with the invention will be described. The essential communication link between the satellite and the submarine is provided by means of a laser 11 operating in the optical wavelengths in the vicinity of visible light and preferably at a selected wavelength which provides a maximum penetration of the atmosphere including water vapor. Penetration of cloud cover will require selection of a wavelength in one of the transmission bands which are generally in the infra red region of the spectrum. This criterion does not coincide with maximum penetration of sea water for making contact with the submarine while submerged. However, the use by the submarine of a surface periscope support for its optical transmission and reception elements will be relatively undetectable and hence the choice of wavelength length for the laser will be made to assure propagation during overcast clouds and rain. Sea water penetration could be achieved, if desired, by proper laser wavelength selection in the visible portion of the spectrum. Both capabilities could be combined in a system which used both lasers and a cloud cover detector to select the appropriate one of the two lasers at any particular time.

The laser 11 emits a beam 12 of coherent light which is directed through an optical system 13 that is adapted to produce an area scan between predetermined limits 14 as required. The optical system 13 may be any well-known optical scanner device, suitable ones being capable of producing full hemispheric scans if required. Due to the nature of the geometry of the problem here involved, the limits 14 of the optical scan will generally be less than a hemisphere and may be set to conform to other system limitations. The optics 13 are scanned by a scan generator 15 which is operating to traverse the area scanned periodically.

The laser 11 is operated on a pulse basis in response to pulses received from a pulse generator 16 with the pulse pattern generated by the generator 16 preferably being somewhat random in order to avoid any significant attaching to the occurrence of a pulse at any given time in the pulse train. The pulse generator 16 is arranged to have a synchronizing input 17 which when energized produces a pulse output that will energize the laser 11 and produce a beam 12 for transmission through the optics 13 at the present scan position within the limits 14.

The normal operation of the system when contact is not completed to any submarine involves only those components just described and consists of the periodic area scan of the optics 13 with the random transmission of a laser beam through the optics in accordance with the triggering of the laser 11 by the random pulse pattern output of the generator 16. Alternatively, the pulse generator 16 can be arranged to produce an output to trigger the laser 11 only when a synchronizing input on line 17 occurs. This mode of operation would be a transponding mode since each laser beam would result from a synchronizing pulse derived from a signal received from a submarine as will hereinafter be described. This transponding mode would have the advantage of relatively infrequent laser beams emanating from the satellite but would have the disadvantage that each beam so emanating would be identified with the location of a submarine.

In order to complete the communication link between the satellite and submarine, it is necessary for a transmission from the submarine to be received to aid the satellite in its tracking of the submarine. For this purpose a wide angle optical system 21 is provided for a two-dimensional array of detectors 22 to provide a continuous surveillance system of the surface of the earth corresponding to the area scan encompassed between the limits 14 of the optical scanning device 13. The detector array 22 is indicated only schematically and will in general be a fine resolution array of photoconductors which are capable of responding to a laser light beam with the optical system 21 imaging the projected area of the earth on the array 22 which will permit the required degree of angular resolution by the array 22. Since narrow beam laser transmission is one of the features of the invention relied upon to achieve security, it will be necessary to provide an accurate angular resolution by means of the array 22 and for this reason the array 22 may be constructed of a very large number of extremely small photo responsive elemental areas. Such an array will also have an appreciable overall size in order that the energization of one of the elemental areas by a laser beam passing through the optical system 21 may be interpreted as an angular location for the origin of that beam from the earth with the desired degree of accuracy. As previously stated, the ultimate beam width of laser transmission will in all probability not be capable of being utilized due to the mechanical limitations of angular orientation of the scanning systems and the limitation on angular resolution which can be obtained in a practical manner from a photoconductor array 22. Accordingly, the resolution of the array 22 may be made compatible with the beam width of the laser transmission employed by using suitably divergent beams obtained by means of the laser optics.

The photo responsive array 22 is connected to a suitable matrix 23 which is adapted to transmit position signals corresponding to the energized photo responsive area of the array 22 upon the energization of a coincidence input 24 to the matrix 23. The signal resolved by the array 22 and converted by the matrix 23 is placed into a storage unit 25 whenever the coincidence input 24 of the matrix is energized with the occurrence of a resolved signal from the array 22. In the storage element 25 the position information may be in any suitable form, such as any binary coded storage signal.

The purpose of the coincidence input 24 of the matrix 23 is to prevent jamming of the system by a continuous illumination or other jamming and noise signals received through the optical system 21. To achieve this the coincidence input 24 is energized from a decoder 26 which is fed from an optical receiver 27. The optical receiver 27 receives optical signals through a suitable system of optics 28 which is observing the same field of view as the optical system 21 and the scan area traversed by the optical system 13. The transmission received by the optical receiver 27 from the submarine is a coded transmission which will satisfy the decoder 26 that a true message from a friendly submarine is being received and thus produce on line 24 the required time coincidence signal for the matrix 23.

The optical receiver 27 may be any suitable device for receiving laser transmissions. For example, a laser photodetector driving a wide band traveling wave tube amplifier or an optical superheterodyne receiver employing a laser local oscillator for demodulating the laser transmissions and recovering the extremely broad band modulation of which laser transmitters are capable will be suitable. With this broad band communication capability, the time intervals for the transmission of any given message content can be made extremely small thereby enhancing the security of the transmission and making cryptographic procedures feasible.

The storage device 25 is arranged to supply its output signal in the form of a binary coded word indicating angular position to a track computer 31 which upon the receipt of a signal begins to compute present angular position corresponding to the initial angular position input signal to compensate for the motion of the satellite relative to the surface of the earth. This present angular position information is applied on line 32 to the storage unit 25 to up-date the present position angular information contained in storage. Obviously, the storage device 25 and the track computer 31 can be arranged as multiple channel devices which are capable of exchanging these signals on a multiple basis to accommodate tracking the present angular position of more than one submarine. Thus if the array 22 is energized by true signals from more than one friendly submarine at different locations within the field of view of the optical systems involved, all of these positional signals can be put into a multiple channel storage 25 and processed sequentially by the track computer 31 to maintain the present angular positions up-dated for as long as desired.

The output of the track computer 31 is applied to a comparator 33 as continuous binary inputs of the present angular position data for all submarines which are currently being tracked and stored in the units 25 and 31. A similar angular position binary signal is derived from the scan unit 15 on line 34 and applied to the comparator device 33 so that an output pulse is obtained on line 35 whenever the scan position 15 coincides with any present position angular data applied from the track computer 31 to the comparator 33. This output pulse on line 35 is applied as a synchronizing signal on input 17 of the pulse generator 16 and therefore triggers the laser 11 to radiate a laser beam at the orientation then provided by the scan optics 13. In this fashion the signal transmitted from the submarine and received through the optics 21 and array 22 and decoded by means of the matrix 23 with the aid of the decoding signal establishes one of the transmission beams from the laser 11 at an angular orientation which will illuminate the submarine and, hence, complete the communication link to the submarine from the satellite. By virtue of the up-dating of angular position data provided by the track computer 31, this synchronization of the laser 11 will occur for each scan cycle produced by the scan device 15 at a time when the beam is directed toward the submarine irrespective of the motion of the satellite above the surface of the earth and hence tracking of the submarine will be good as long as the submarine is stationary within the limits of the beam width transmitted.

The communication link via the laser beam through the optics 13 to the submarine is adapted to be modulated with a coded message to provide data link transmission and for this purpose a suitable modulator 37 is connected to modulate the laser 11. The normal message content provided by the modulator 37 is obtained from a dummy message unit 38 which is connected to be synchronized by the pulse outputs of the generator 16 and, therefore, supply message content input to the modulator 37 which is applied as modulation to the laser 11 for all dummy transmissions. For this purpose a switch unit 39 is arranged to normally connect the dummy message unit 38 to the input of the modulator 37.

Upon the occurrence of an output from the comparator device 33 on line 35, a connection 41 to the switch 39 changes the state of the switch 39 to connect a buffer 42 to the input of the modulator 37 and disconnect the dummy message unit 38 from modulator 37. The same pulse on line 35 from the comparator device 33 is also applied to the buffer storage unit 42 to read out of storage whatever message may have been placed in the buffer 42 prior to the time of occurrence of the pulse on line 35. Thus the output of the comparator device 33 switches the input of the modulator 37 from the dummy unit 38 to the buffer 42 and reads out of the buffer 42 any messages contained therein, as modulation for laser 11. In this fashion the laser beam which is selected to be transmitted at the time the optics 13 is oriented to illuminate the submarine will also be modulated with the message from the buffer 42. The buffer 42 may contain a residual dummy message for modulating the laser 11 in the absence of a current real message to avoid the transmission of a tell-tale unmodulated beam.

For the purpose of completing the communication data link with a shore station or other remote station on or above the surface of the earth, a radio relay 43 is provided having a suitable antenna system 44 for conventional data link type transmission between the earth and the satellite. Messages received from the command station on the earth by the radio relay 43 are placed in buffer storage 42 for transmission to the submarine at the next transmission which will illuminate the recipient submarine. For this purpose a suitable address may be added to the message which can be arranged to be rejected by all but the addressed receiver submarine to effect selective call. Alternative arrangements for selective call are possible and may, in fact, be preferable to avoid the repeated transmission of a true message for detection and deciphering by the enemy. Suitable arrangements for using an address code as received on the optical receiver 27 to channel addressed messages from the radio relay 43 into a multi-channel buffer 42 with read out from the multiple channels in buffer 42 being selective in accordance with the scan location of the unit 15 corresponding to the addressed submarine can readily be provided by those skilled in the art. With an arrangement of this type, the multi-submarine capability of the system will be achieved with a transmission of the addressed messages occurring only once, after which the individual channel can be cleared of the message but retaining the address awaiting the receipt of the next message addressed to that particular submarine.

The communication link from the submarine to the satellite is completed by means of a laser beam received by the optical receiver 27, as previously described. In addition to decoding this message for the purpose of transferring signals from matrix 23 into storage 25, the decoder 26 may be employed to transmit true messages into a buffer 45. The buffer 45 also is arranged to receive on line 30 the angular information data signal that is present in the storage unit 25 and continuously up-dated by means of the track computer 31. The signal in buffer 45 may, therefore, include an address identifying the submarine from which the communication has been received, a message transmitted by the submarine, and further characterized by the angular position of that submarine from the satellite. The information from the buffer 45 is transmitted by the radio relay 43 to the ground station whenever the radio relay is free for access by the buffer 45, i.e., whenever it is not receiving transmissions from the ground if a single channel radio link is employed. Manifestly, the buffer 45 may be a multiple channel storage unit with plural submarines accommodated by a plurality of channels available for the address, message and angular position signals.

Referring to FIG. 2, the equipment required aboard the submarine or other mobile vehicle to complete the system will be described. An optical system 51 is adapted to receive laser beam transmissions from a predetermined field of view for application to an optical receiver 52 which may be of the same general type as the receiver 27. Signals received by the optical receiver 52 are decoded by a decoder 53 which is adapted to process the security code employed and pass the message content into storage 54 from which it may be read out in any conventional read-out device 55.

For the purpose of initiating the tracking operation in the satellite, a narrow laser beam transmission from the submarine is required in accordance with the invention. For this purpose a laser 56 is provided with a suitable optical system 57 which is capable of directing the laser beam in any desired angular orientation. A modulator 58 is provided to modulate message content on to the laser transmission and a pulse generator 59 is provided to trigger the transmission burst from the laser 56. The transmission sequence can be initiated by applying a signal on an input 61 to the modulator 58 for applying identifying address and code modulation to the laser 56 as it is triggered by the pulse generator 59 which is triggered by the output of the modulator 58.

The orientation of the beam provided by the optical system 57 is controlled by a tracker unit 62 which has a manual input 63 for establishing an initial orientation of the beam 64 emanating from the optics 57. Since the submarine has precise information as to its own present position and will be aware of the established orbit of the satellite, the manual input 63 can be employed to orient the beam 64 to an angular position which will illuminate the satellite for the single transmission burst initiated by an input to the modulator 58 on lead 61. Tracking the satellite from the submarine is completed upon the receipt of a laser beam by the optical receiver 52 which when decoded is applied via lead 65 to the tracker 62 for the purpose of operating the tracker 62 and optical system 57 in the track mode to track the orbit of the satellite. This tracking may be on the basis of the precomputed satellite orbit as a function of time and the present position of the submarine or it may be with the aid of angular position information transmitted from the satellite and received by the submarine in receiver 52. For this purpose the angular position of the optics 13 in the satellite are modulated on to the transmission from laser 11 in addition to other message content giving the polar cordinates of the line of sight between the satellite and the submarine which polar cordinates are applied on line 65 to the tracker 62 for correcting the angular orientation of the optics 57 thereby assuring illumination of the satellite whenever a subsequent transmission by the laser 56 occurs. It will be appreciated that once tracking is established preferably by a single burst transmission from the laser 56 no further transmission from the submarine will occur unless an actual message content signal is to be transmitted via the satellite to the command post shore station which message may be applied at the input 61 to the modulator 58. In this mode of operation, in order to maintain security of the submarine, no such transmissions will be made unless absolutely necessary and the only transmission which the submarine will be required to complete is a single burst for tracking purposes whenever the submarine changes it position by an amount greater than the beam width of the transmissions involved or the satellite passes out of range and a new satellite is selected by the submarine for maintaining the communication link.

The apparatus of FIG. 2 may be carried aboard the submarine with suitable portions thereof available on a periscope type mount in order that the optical elements may be raised to the surface of the sea under adverse conditions. Whenever the angle of transmission to the satellite is such that an unfavorable angle of incidence to the surface of the sea exists, penetration of the laser beam transmission from the satellite cannot be relied upon and the erection of the optical elements to the surface of the sea may be required. Under sea state conditions when the surface of the sea presents a rapidly varying interface angle due to wave action, the surface optical elements may also be used. Under conditions of favorable angle of incidence in relatively calm seas, however, the optical transmissions involved may be relied upon to penetrate the sea water to a certain extent and the submarine may, therefore, communicate without the possibility of disclosing its position by any periscope projection to the surface of the sea.

The signal on line 65 which is periodically received at the rate of the area scan provided by the unit 15 of the satellite may be employed as a trigger signal to the input 61 of the modulator 58 whenever the tracking signal from the satellite is not received. For this purpose an integrator unit 66 is energized by the periodic output on line 65 to produce no output as long as the periodic signals having the period of the scan unit 15 in the satellite are received. If these signals should be lost, however, the unit 66 produces an output to the input 61 of the modulator 58 thereby producing a laser burst output beam 64 which supplies the satellite with a new tracking aid signal in order to re-establish tracking from the satellite. Obviously, this sequence will have to be perfected while the satellite is still within the beam width of the beam 64. If difficulty is encountered in intercepting the satellite with the beam 64 under any conditions, it may be expedient to provide the optical system 57 with a control 67 which will make the beam 64 more widely divergent during search mode in order to secure an interception of the beam 64 with the satellite.

Many refinements in the system which are conventional techniques in modern day astronautic and communication systems have not been mentioned but will be recognized as requirements by those skilled in the art. For example, in order for the satellite to accomplish tracking as contemplated by the invention, a stabilization system will be required and a stable vertical reference may be achieved by suitable inertial systems or an horizon scanner or both. Ordinarily, a sufficiently stable orbit for the satellite can be achieved to permit an accurate prediction of present position of the satellite in order for the submarine to initiate tracking with a minimum amount of radiation emanating from the submarine. If this proves to be a difficult criterion to meet, a suitable continuous radio or infra red tracking signal may be radiated from the satellite for permitting the submarine to locate the satellite with sufficient angular accuracy to make the requisite transmission of its laser beam on a short term and highly sporadic basis as contemplated herein.

In situations where maximum security is not a primary factor, the system can be readily modified to permit a transponding mode between the lasers in the satellite and the ground station. For example, each satellite laser transmission would be triggered by the receipt of a laser transmission from the ground station and vice-versa to maintain data exchange therebetween. For these systems angle tracking of the beams would be simplified by introducing well-known conical scan techniques and transponding off-axis error signals to servo the scan axis.

In order to avoid characterizing the tracking beams from the satellite by virtue of the fact that, while tracking, the beam illuminating a submarine is stationary on the surface of the earth, the false beams can also be arrested in angular position to present a stationary ensemble of beam positions.

While the invention has been described for use in communicating with a submarine, it will be apparent that the broad features of the invention can be more widely applied.

I claim:

1. The method of communicating with a mobile vehicle comprising the steps of transmitting a laser beam toward an orbiting satellite from a vehicle within the portion of the earth's surface beneath said satellite, detecting said laser beam received at said satellite to determine the angular orientation of said vehicle from said satellite, utilizing the angular orientation data so obtained to establish a narrow beam communication link from said satellite to said vehicle, and communicating with said vehicle from a remote point via said satellite and said narrow beam communication link.

2. The method of communicating with a mobile vehicle comprising the steps of scanning a portion of the earth's surface with an optical spot scan from an orbiting satellite, transmitting a laser beam toward said satellite from a vehicle within said portion of the earth's surface, detecting said laser beam received at said satellite to determine the angular orientation of said vehicle from said satellite, utilizing the angular orientation data so obtained to transmit a laser beam from said satellite through said optical scan when said scan is oriented toward said vehicle, detecting the laser beam received at said vehicle, and communicating with said vehicle from a remote point by messages exchanged between said remote point and said satellite with said messages being exchanged between said satellite and said vehicle by modulation of the laser beams transmitted and demodulation of the laser beams received.

3. The method according to claim 2 in which the laser beam from said satellite is repeatedly transmitted throughout said optical scan to produce a plurality of laser beams of different angular orientation emanating from said satellite, all of said beams being modulated and indistinguishable from each other except for the message content of the laser beams oriented toward said vehicle.

4. The method of establishing a communication link via a relay satellite comprising the steps of illuminating said satellite with a narrow beam energy transmission from a ground station and utilizing the received energy transmission at the satellite to orient a narrow beam energy transmission from the satellite to the ground station to complete the communication link between the satellite and ground station.

5. The method according to claim 4 in which said narrow beam transmissions are laser beams operating at a wavelength in the infra-red portion of the spectrum selected for transmission through the atmosphere containing water vapor.

6. The method according to claim 4 in which said narrow beam transmissions are laser beams operating at a wavelength in the blue-green portion of the spectrum selected for transmission through sea water.

7. The method of communicating with a first station comprising the steps of transmitting a laser beam toward an orbiting satellite from said first station, detecting said laser beam received at said satellite to determine the angular orientation of said first station from said satellite, utilizing the angular orientation data so obtained to establish a narrow beam communication link from said satellite to said first station and communicating with said first station from a remote point via said satellite and said narrow beam communication link.

8. The method of claim 7 wherein said narrow beam communication link is a laser beam.

9. The method of communicating with a submarine comprising the steps of scanning an area beneath an orbiting satellite to cover the expected location of the submarine, receiving a message on said satellite from a ground station and transmitting a laser beam communication of said message from said satellite to said submarine.

10. The method of communicating with a submarine comprising the steps of relaying a message from a ground station to an orbiting earth satellite, modulating a laser on board said satellite with said message, radiating the modulated laser beam from said satellite to the surface area of the ocean where said submarine is located, and detecting the message at said submarine from said modulated laser beam received at said submarine.

11. The method according to claim 9 or 10 wherein said laser beam operates in the blue-green portion of the spectrum selected for transmission through sea water and said submarine is adapted to detect said message from said laser beam while submerged.

12. The method according to claim 10, wherein said laser beam operates in the blue-green portion of the spectrum selected for transmission through sea water and said modulated laser beam is scanned over the area of the ocean where said submarine is located.

13. A station for a two-way optical communication system comprising:
means for producing an exiting light-beam;
means for impressing only communication-data onto said exiting light-beam;
means for steering said exiting light-beam toward a target station;
means for receiving a single incoming light-beam from said target station, said single incoming light beam adapted to have only communication-data modulated thereon; and
means for causing said single incoming light-beam to produce both tracking-signals and data-signals.

14. A satellite communication relay station comprising:
an orbiting earth satellite;

a radio relay on board said satellite operable to transmit and receive messages between said satellite and a ground station;

laser transmission means on board said satellite including means for modulating a transmitted laser beam with a message received via said radio relay and means for directing said modulated laser beam toward a remote station;

laser receiving means on board sadi satellite for receiving a laser beam from said remote station and demodulating received laser energy to recover message content thereof; and means for modulating the message content obtained from a received laser beam onto the transmitter of said radio relay to transmit said message content to said ground station.

15. A satellite communication station comprising:

a satellite vehicle having on board:

a radio receiver for receiving and demodulating a radio signal transmitted to said satellite from a first remote station to obtain the message content of said radio signal;

laser transmitter means operable for transmitting a laser beam from said satellite;

means for modulating the transmitted laser beam with said message content; and means for directing the modulated laser beam toward a second remote station to transmit said message content to said second remote station.

* * * * *